(12) United States Patent
Sodagar

(10) Patent No.: US 11,228,796 B2
(45) Date of Patent: Jan. 18, 2022

(54) PATTERN ADDRESSING FOR SESSION-BASED DASH OPERATIONS

(71) Applicant: Tencent America LLC, Palo Alto, CA (US)

(72) Inventor: Iraj Sodagar, Los Angeles, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/095,182

(22) Filed: Nov. 11, 2020

(65) Prior Publication Data

US 2021/0211759 A1 Jul. 8, 2021

Related U.S. Application Data

(60) Provisional application No. 62/958,136, filed on Jan. 7, 2020.

(51) Int. Cl.
*H04N 21/266* (2011.01)
*H04N 21/4402* (2011.01)
*H04N 21/2662* (2011.01)

(52) U.S. Cl.
CPC ... *H04N 21/26613* (2013.01); *H04N 21/2662* (2013.01); *H04N 21/440245* (2013.01)

(58) Field of Classification Search
None
See application file for complete search history.

(56) References Cited

U.S. PATENT DOCUMENTS

2016/0261665 A1* 9/2016 Stockhammer ..... H04L 65/4069
2018/0053217 A1* 2/2018 Yamagishi ......... G06Q 30/0269
2019/0222881 A1* 7/2019 Hirabayashi ....... H04N 21/4728

OTHER PUBLICATIONS

Information technology—Dynamic adaptive streaming over HTTP (DASH)—Part 8: Session-based DASH operations, ISO/IEC JTC 1/SC 29, Date: Jan. 2, 2020, ISO/IEC WD 23009-8, ISO/IEC JTC 1/SC 29/WG 11, 17 pgs.

* cited by examiner

*Primary Examiner* — Junior O Mendoza
(74) *Attorney, Agent, or Firm* — Oblon, McClelland, Maier & Neustadt, L.L.P.

(57) ABSTRACT

A method of session-based DASH operations can include receiving a media presentation description (MPD) referencing a session-based description (SBD) and indicating a key name during a media access session. The SBD includes a first repeating pattern element that includes a first sequence of timed key values of the key name. The first repeating pattern element indicates that the first sequence of the timed key values of the key name is repeated along a timeline or an orderline. A first key value of the key name corresponding to a timing or a segment number of a current segment of a sequence of segments can be determined based on the first repeating pattern element in the SBD. A request for the current segment can be transmitted to a media content server. The request includes a pair of the key name and the first key value.

20 Claims, 4 Drawing Sheets

PATTERN ADDRESSING FOR SESSION-BASED DASH OPERATIONS

INCORPORATION BY REFERENCE

This present application claims the benefit of priority to U.S. Provisional Application No. 62/958,136, "PATTERN ADDRESSING FOR SESSION-BASED DASH OPERATIONS" filed on Jan. 7, 2020, which is incorporated by reference herein in its entirety.

TECHNICAL FIELD

The present disclosure describes embodiments generally related to methods and apparatuses for dynamic adaptive streaming over hypertext transfer protocol (DASH).

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Moving picture expert group (MPEG) dynamic adaptive streaming over hypertext transfer protocol (DASH) provides a standard for streaming multimedia content over IP networks. In the DASH standard, a media presentation description (MPD) is used to provide information for a DASH client to adaptively stream media content by downloading media segments from a DASH server. However, the MPD is generic for all DASH clients. Accordingly, a DASH client may acquire a side file, such as a session-based description (SBD) file, which provides information for the client to make the MPD specific for a DASH viewing session.

SUMMARY

Aspects of the disclosure provide a method of session-based dynamic adaptive streaming over HTTP (DASH) operations at a DASH client. The method can include receiving a media presentation description (MPD) referencing a session-based description (SBD) and indicating a key name during a media access session. The MPD describes a media presentation of media content partitioned into a sequence of segments. The SBD referenced by the MPD can be received. The SBD includes a first repeating pattern element that includes a first sequence of timed key values of the key name. The first repeating pattern element indicates that the first sequence of the timed key values of the key name is repeated along a timeline or an orderline. A first key value of the key name corresponding to a timing or a segment number of a current segment of the sequence of segments can be determined based on the first repeating pattern element in the SBD. A request for the current segment can be transmitted to a media content server. The request includes a pair of the key name and the first key value.

In an example, the first repeating pattern element includes a repetition attribute indicating how many times the first sequence of the timed key values of the key name are repeated. In an example, when the repetition attribute has a value of −1, the first sequence of the timed key value of the key name is repeated until the end of the media access session. In an example, when the repetition attribute has a value of 1, the first sequence of the timed key value of the key name is not repeated.

In an example, the first repeating pattern element includes a second repeating pattern element in a nested manner. The second repeating pattern element includes a second sequence of timed key values of the key name. The second sequence of the timed key values of the key name is repeated as indicated by the second repeating pattern element to form a third sequence of timed key values of the key name. The third sequence of the timed key values of the key name is part of the first sequence of the timed key values of the key name.

In an example, the SBD includes a fourth sequence of timed key values of the key name outside of the first repeating pattern element. In an example, the first repeating pattern element includes a start time attribute indicating a start timing when the first sequence of the timed key values of the key name in the first repeating pattern element begins to apply. In an example, the start timing is represented by an offset with respect to a reference timing.

In an embodiment, the first sequence of the timed key values of the key name is repeated along the orderline, and the first repeating pattern element includes a start count attribute indicating a start segment number from which a sequence of the timed key values of the key name in the first repeating pattern element begins to apply. In an embodiment, the start segment number is a segment number with respect to a start timing indicated by an SBD start time attribute of the SBD.

Aspects of the disclosure provide an apparatus of session-based DASH operations. The apparatus can include circuitry configured to receive an MPD referencing an SBD and indicating a key name during a media access session. The MPD describes a media presentation of media content partitioned into a sequence of segments. The SBD referenced by the MPD can be received. The SBD includes a first repeating pattern element that includes a first sequence of timed key values of the key name. The first repeating pattern element indicates that the first sequence of the timed key values of the key name is repeated along a timeline or an orderline. A first key value of the key name corresponding to a timing or a segment number of a current segment of the sequence of segments can be determined based on the first repeating pattern element in the SBD. A request for the current segment can be transmitted to a media content server. The request includes a pair of the key name and the first key value.

Aspects of the disclosure also provide a non-transitory computer-readable medium storing instructions which when executed by a computer for receiving media data cause the computer to perform the method of session-based DASH operations.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
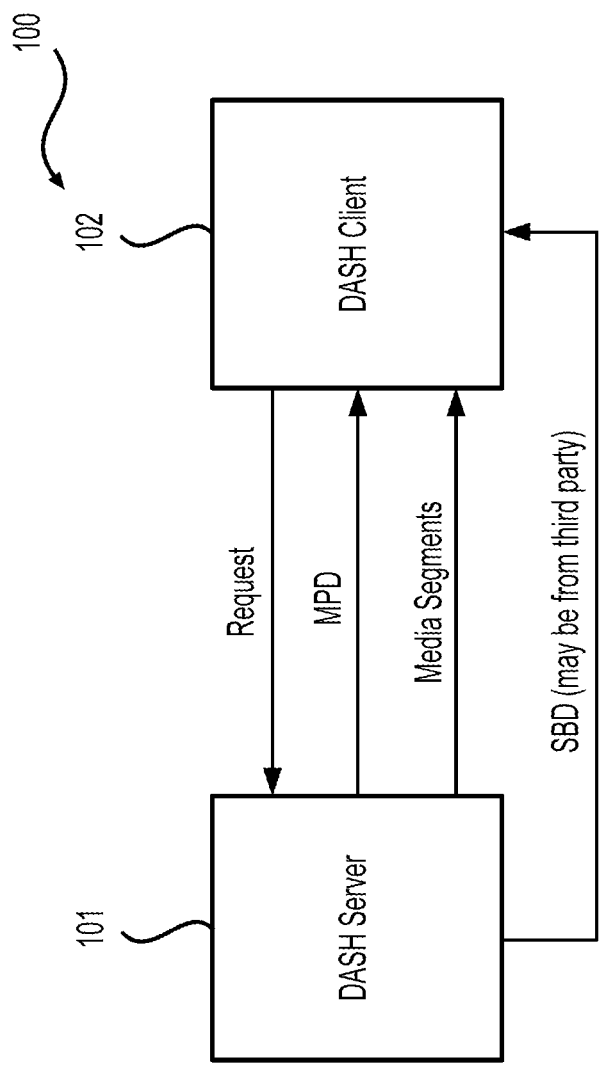
FIG. 1 shows an exemplary dynamic adaptive streaming over hypertext transfer protocol (DASH) system according to an embodiment of the disclosure.

I. Dynamic Adaptive Streaming Over Hypertext Transfer Protocol (DASH) and Media Presentation Description (MPD)

Dynamic adaptive streaming over hypertext transfer protocol (DASH) is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD file can be defined with a hierarchical data model. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain one period or a sequence of periods. Each of the one or more periods can be defined by a period element in the MPD file. The MPD file can include an availableStartTime attribute for the MPD and a start attribute for each period. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods.

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI). The MPD file can provide the identifiers for each segment. In some examples, the MPD file can also provide byte ranges in the form of a range attribute, which can correspond to the data for a segment within a file accessible by the URL, URN, or URI.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some embodiments, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

II. Session-Based DASH Operations and Session-Based Description (SBD)

The MPD file can be generic for all DASH clients. In order to make the MPD file specific for a session of a DASH client, moving picture expert group (MPEG) developed a scheme to support session-based DASH operations. In session-based DASH operations, the DASH client can receive a side file, referred to as a session-based description (SBD) file, which provides information for the DASH client to customize the MPD file per session and possibly per client.

FIG. 1 shows a session-based DASH system (100) according to an embodiment of the disclosure. In the session-based DASH system (100), an MPD file is sent from a DASH server (101) (e.g., a content server) to a DASH client (102). The DASH client (102) can receive media segments from the DASH server (101) based on the MPD file. The DASH client (102) can send a request to the DASH server (101) for updating the MPD file. In addition, the DASH client (102) can receive an SBD file (also referred to as an SBD document) from the DASH server (101) or a third party (e.g., session controller).

In various examples, multiple DASH servers can send MPD file and media segments. The MPD file and the media segments can be sent to the DASH client (102) from different DASH servers. A DASH server receiving the request send from the DASH client (102) can be different from a DASH server sending the media segments.

According to aspects of the disclosure, the SBD file can include a plurality of time ranges and corresponding key-value pairs (or name-value pairs), along with additional metadata. The SBD file can be referenced in the MPD file by, for example, a URL. The SBD file can be used to customize the MPD file received by the DASH client (102) to be specific for a session of the DASH client (102). For example, the SBD file can allow adding session-specific parameters to segment URLs without generating unique per-session MPDs.

Figure 2:
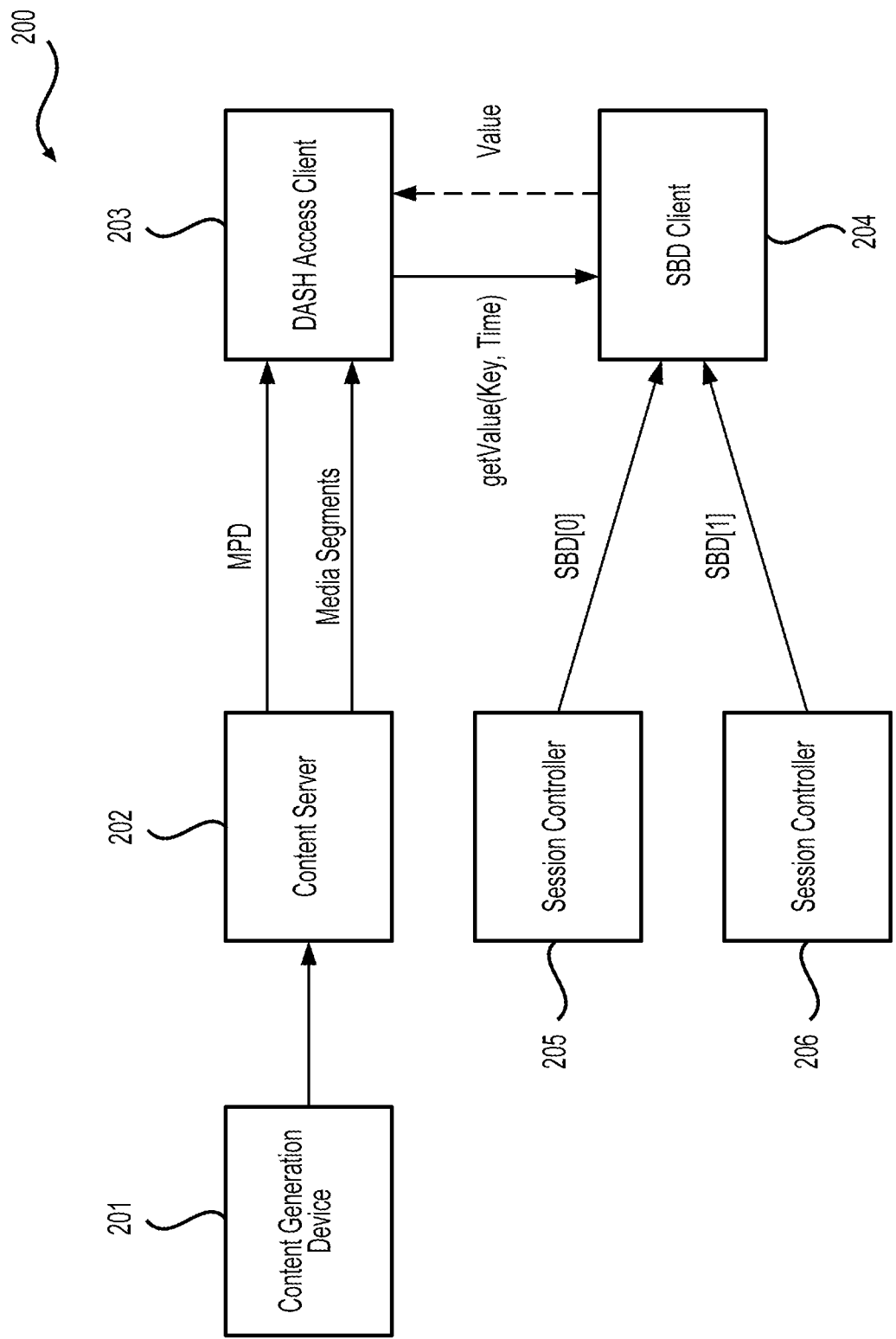
FIG. 2 shows another exemplary DASH system according to an embodiment of the disclosure.

FIG. 2 shows another session-based DASH system (200) according to an embodiment of the disclosure. In the session-based DASH system (200), multimedia content is prepared and generated by a content generation device (201) (e.g., smartphone) which can include an audio source (e.g., microphone) and a video source (e.g., video camera). The multimedia content can be stored by the content generation device (201) or sent to a content server (202) which can store various multimedia contents. The multimedia content can be described by an MPD file. The MPD file can be stored and updated by the content server (202) and accessed by the client devices including the DASH access client (203) to retrieve media segments. The content server (202) can receive a request from client devices, such as a DASH access client (203), for one or more media segments of the multimedia content.

In order to obtain session specific information, the DASH access client (203) can send a request to an SBD client (204) (e.g., session client) for accessing an SBD file. The SBD file can include a plurality of time ranges and corresponding key-value pairs for the current session. For example, the DASH access client (203) can send a key name (e.g., name of a parameter) and a time to the SBD client (204). In response, the SBD client 204 can return a value corresponding to the key name and the time to the DASH access client (203). The DASH access client (203) can include the value in a query part of a segment URL in a request. The request can be sent to the content server (202) for requesting the corresponding media segment. For example, the segment request can be a HTTP GET or partial GET request.

The SBD client (204) can receive multiple SBD files from different session controllers, such as a session controller (205) and a session controller (206).

According to aspects of the disclosure, in various examples, any or all of the features of the content server (202) (e.g., a DASH server) can be implemented on one or more devices of a content delivery network (CDN), such as routers, bridges, proxy devices, switches, or other devices. In an example, the content server (202) can include a request processing unit configured to receive network requests from the client devices (e.g., DASH access client (203)). For example, the request processing unit can be configured to receive HTTP GET or partial GET requests and provide data of multimedia contents in response to the requests. The requests can specify a segment using a URL of the segment. In some examples, the requests can also specify one or more byte ranges of the segment, thus comprising partial GET requests. The request processing unit can further be configured to service HTTP HEAD requests to provide header data of a segment.

In various examples, the content generation device (201) and the content server (202) can be coupled by a wireless network or a wired network, or can be directly communicatively coupled. The content generation device (201) and the content server (202) can be included in a same device. The content server (202) and the session controllers (205)-(206) can be included in a same device. The content server (202) and the DASH access client (203) can be coupled by a wireless network or a wired network. The SBD client (204) and the session controllers (205)-(206) can be coupled by a wireless network or a wired network, or can be directly communicatively coupled.

In some embodiments, the DASH access client (203) and the SBD client (204) can be included in a same device. The device can function as a DASH client performing functions of both the DASH access client (203) and the SBD client (204).

III. Sessions and Session Parameters

In various embodiments, the SBD mechanism allows adding session-specific elements to segment URLs without generating unique per-session MPDs. Session parameter strings pertaining to a specific time range on a timeline in an SBD can be parsed by the SBD client (204) and are translated into parameters to be added to HTTP segment request(s) issued by the DASH access client (203). The SBD can be referenced in the MPD by its URL.

As an example, the information carried in an SBD can be conceptually presented in Table 1.

TABLE 1

| Start time | p1 | p2 |
|---|---|---|
| 00:00:00 | foo | 42 |
| 00:00:42 | bar | 420 |
| 00:04:20 | null | null |

In Table 1, each row corresponding to a time range, and each column corresponding to one named parameter. Parameters "p1" and "p2" is expected to carry information in the query part of the segment request URL. For time range 00:00:00-00:00:42, the "p1" value is "foo" and the "p2" value is 42. For the time range 00:00:42-00:04:20, "p1" is "bar" and "p2" is 420. In the case of two-second segments, the first 21 segments would include "p1=foo&p2=42" as a part of their URL query parameters, and the following 109 segments would include "p1=bar&p2=420" as a part of the segment URL in an HTTP GET request.

IV. Timeline and Orderline Addressing

In some embodiments, the SBD document may conceptually include one or more tables each associated with an identified (ID). Each table can contain the key-value pair assignments for different time intervals, as shown in Table 2.

TABLE 2

| Order | $k_1$ | $k_2$ | . . . | $k_n$ |
|---|---|---|---|---|
| $t_1$ | $v_{1,1}$ | $v_{1,2}$ | . . . | $v_{1,n}$ |
| $t_2$ | | | | |
| . . . | | | | |
| $t_n$ | | | | |

In Table 2, ti indicates a moment in media timeline, and $(k_j, v_{i,j})$ are the key-value pair j for time ti.

Alternatively, The SBD document may conceptually include one or more tables. Each table can contains the key-value pair information for segments order as shown in Table 3.

TABLE 3

| Order | $k_1$ | $k_2$ | ... | $k_n$ |
|---|---|---|---|---|
| $n_1$ | $v_{1,1}$ | $v_{1,2}$ | ... | $v_{1,n}$ |
| $n_2$ | | | | |
| ... | | | | |
| $n_m$ | | | | |

In the Table 3, $n_i$ is a segment index or segment number indicating segment $n_i$ and $(k_j, v_{i,j})$ are the key-value pair j for all segments from segment $n_i$ to segment $n_{i+1}$, but not including $n_{i+1}$ segment.

V. MPD Signaling for SBD

In some examples, one or more SBD descriptors can be defined to signal the session-based information in a DASH manifest. In an example, an SBD descriptor can appear at one or more levels for the MPD hierarchical data model, one or more times.

In an example, an SBD descriptor can be an essential property descriptor, denoted by EssentialProperty, of an MPD. For example, the SBD descriptor can have a URN "urn:mpeg:dash:sbd:2020" as its @schemeIdUri and may contain one or more KeyList elements. As an example, Table 4 shows an MPD EssentialProperty Descriptor including elements and attributes for signaling an SBD.

MPD per session and per client. In such a scenario, an SBD file can contain an element (named as a key value time line element) to describe the timing or order for segments and the corresponding key-value pairs corresponding to each entry in an SBD table (e.g., similar to Table 2 or Table 3).

Table 5 shows an example of the key value time line element implementing the simple SBD timeline addressing. The key value time line element can be part of an SBD file in form of extensible markup language (XML).

TABLE 5

| Row number | Key value timeline element |
|---|---|
| 1 | <KeyValueTimeline id="1" |
| 2 |    <Timeline> |
| 3 |       <V s="0" d"1"     v=[ "d4baa823" ] /> |
| 4 |       <V d="3",         v=[ "861d34d7" ] /> |
| 5 |       <V d="1",         v=[ "75b49311" ] /> |
| 6 |    </Timeline> |
| 7 | </KeyValueTimeline> |

In Table 5, the key value time line element, denoted by KeyValueTimeline, includes a timeline element (from row 2 to row 6). The timeline element includes three value elements, denoted by V (from row 3 to row 5). Each of the three value elements includes a duration attribute, denoted by d, and a key value attribute, denoted by v. In addition, the first value element also includes a start time attribute, denoted by s. For example, assuming a timescale of 1 second is used, the key value time line element start to apply at a time offset of 0 with respect to a reference timing (e.g., a start time for applying the SBD including the key value time line element

TABLE 4

| Element or Attribute Name | Use | Description |
|---|---|---|
| EssentialProperty | | instantiation of EssentialProperty (defined in ISO/IEC 23009-1) for session-based DASH operations |
| @schemeIdUri | M (string) | can be set to "urn:mpeg:dash:sbd:2020". |
| @value | M (string) | URL of the SBD document for this session |
| @template | O | template for applying to the key-value pair found in SBD document. |
| Key | 1 ... N | a key name to be found in SBD document and its default value. If absent, all keys and corresponding values in the corresponding keyList of the SBD document shall be added to the (sub)segment request URL query. |
| @name | M | name of the key of the SBD document to be added to the queries for this session after processing described by @template. This value can be a string without whitespaces, start with a letter, and contain only unreserved characters per RFC 3986. If @name value does not appear in the keyList of SBD document, the @name value-@defaultValue value pair shall be used in the template or in the absence of the template. |
| @defaultValue | OD ('null') | default value in key-value pair if @name value not found in SBD document or if there is no value defined for a requested time range or segment number in the SBD document. |

Legend:
For attributes: M = Mandatory, O = Optional, OD = Optional with Default Value, CM = Conditionally Mandatory.
For elements: <minOccurs> ... <maxOccurs> (N = unbounded)
Elements are bold; attributes are non-bold and preceded with an @.

VI. Pattern-Based Addressing for Session-Based DASH Operations

VI. 1 Simple Timeline Addressing Scheme

In some examples, a simple timeline addressing scheme is used for session-Based DASH operation to customize an in Table 5, or a start time of a period containing a reference to the SBD of Table 5). From row 3 to row 5, the sequence of the three key values are applied to three respective consecutive durations lasting for 1, 3, and 1 seconds, respectively.

In the cases where there is a repeating pattern in a corresponding key-value pair table, the pattern can be repeated based on the simple timeline addressing scheme. For instance, if the key-value pairs of Table 5 are repeated 3 times, the corresponding SBD file would be what is shown in Table 6. The sequence of key values in rows 3-5 is repeated twice in rows 6-8 and rows 9-11. Repetition of the patterns results in the growth of the SBD file proportional to the number of repeating times.

TABLE 6

| Row number | Key value timeline element | |
|---|---|---|
| 1 | <KeyValuetimeline id="1" | |
| 2 | <Timeline> | |
| 3 | <V s="0" d="1", | v=[ "d4baa823" ] /> |
| 4 | <V d="3", | v=[ "861d34d7" ] /> |
| 5 | <V d="1", | v=[ "75b49311" ] /> |
| 6 | <V d="1", | v=[ "d4baa823" ] /> |
| 7 | <V d="3", | v=[ "861d34d7" ] /> |
| 8 | <V d="1", | v=[ "75b49311" ] /> |
| 9 | <V d="1", | v=[ "d4baa823" ] /> |
| 10 | <V d="3", | v=[ "861d34d7" ] /> |
| 11 | <V d="1", | v=[ "75b49311" ] /> |
| 12 | </Timeline> | |
| 13 | </KeyValuetimeline> | |

VI. 2 Pattern Based Timeline and Orderline Addressing

Since in some applications, the pattern of queries may be repeated, aspects of the disclosure provide a pattern-based addressing scheme. By employing the pattern-based addressing scheme, a more compact representation of an SBD can be achieved which saves bits for signaling the SBD and time for parsing the SBD. The savings on bits and time can be proportional to the number of pattern repetition times.

In an embodiment, an element can be defined to signal the repeating pattern in the sequence of timed key values in Table 6. Such an element can be referred to as a repeating pattern element or pattern element. Table 7 shows an example key value timeline element in XML using the pattern element for timeline addressing.

TABLE 7

| Row number | Key value timeline element | |
|---|---|---|
| 1 | <KeyValuetimeline id="1" | |
| 2 | <Timeline> | |
| 3 | <P s="0" r="3"> | |
| 4 | <V d="1" | v=[ "d4baa823" ] /> |
| 5 | <V d="3", | v=[ "861d34d7" ] /> |

TABLE 7-continued

| Row number | Key value timeline element | |
|---|---|---|
| 6 | <V d="1", | v=[ "75b49311" ] /> |
| 7 | </P> | |
| 8 | </Timeline> | |
| 9 | </KeyValuetimeline> | |

As shown in Table 7, a repeating pattern element, denoted by P, is included from row 3 to row 7. As a result of using the P element, the repeating pattern in Table 6 is signaled using two additional lines at rows 3 and 7 instead of repeating the pattern with 6 more lines. In addition, the P element includes a repetition attribute, denoted by r, to indicate how many times the sequence of timed key values (at rows 4-6) within the P element are repeated.

Table 8 shows an example key value timeline element in XML using the pattern element for oderline addressing.

TABLE 8

| Row number | Key value timeline element | |
|---|---|---|
| 1 | cKeyValuetimeline id="1" | |
| 2 | <Oderline> | |
| 3 | <P | c="5" r="3"> |
| 4 | <O v=[ "d4baa823" ] /> | |
| 5 | <O v=[ "861d34d7" ] /> | |
| 6 | <O v=[ "75b49311" ] /> | |
| 7 | </P> | |
| 8 | </Oderline> | |
| 9 | </KeyValuetimeline> | |

As shown in Table 8, a P element is included in an orderline element in the key value timeline element. The P element includes three orderline value elements at rows 4-6, denoted by O. Each O element includes a key value attribute, denoted by v. In addition, the P element can include a starting segment number attribute, denoted by c, indicating a time offset with respect to a reference timing. For example, the reference timing can be a start time for applying an SBD including the key value time line element in Table 8, or a start time of a period containing a reference to the SBD of Table 8. The attribute c with a value of 5 can indicate the first 4 segments with respect to the reference timing can be skipped. The key values in the P element start to apply from the fifth segment.

VI. 3 Timeline Addressing with Pattern Addressing

Table 9 shows a semantic table of an example timeline element with pattern addressing being employed according to some embodiments of the disclosure.

TABLE 9

| | Element or Attribute | Name | Use | Description |
|---|---|---|---|---|
| 0 | | KeyValuetimeline | | Provides information on a key-value pair in the query string. NOTE: Value may change from (sub)segment to (sub)segment. Subsegment is a unit within a segment and corresponds to a subset of bytes of the segment. |
| 1 | | @id | M | A unique integer identifier in the SBD file |
| 2 | | @keys | M (string) | List of unique key names of key-value properties described in this element. |
| 3 | | @comment | O (string) | A human-readable comment about the file. |
| 4 | | @timescale | OD | Timescale in ticks per second for the @d attributes. The default value is 1 (i.e., by default, V@d is in seconds). This value shall be ignored for orderline addressing. |

TABLE 9-continued

| | Element or Attribute Name | Use | Description |
|---|---|---|---|
| 5 | @type | OD | Possible values: "dynamic", "static". Default: "static". Static: the SBD file and its values shall not change during the streaming session. Dynamic: the SBD file and its value may be updated every @ttl seconds. |
| 6 | @ttl | CM | The minimum guaranteed duration in seconds that the dynamic SBD is not updated. This attribute shall not be present when @type = static. |
| 7 | timeline | 0 . . . 1 | Values with their time values. The timeline element shall have at least one P element or at least one V element. |
| 8 | V | 0 . . . 1 | Values with corresponding time values. |
| 9 | P | 0 . . . N | A pattern including a sequence of timed values that can be repeated. |
| 10 | V | 0 . . . N | For nested key values. |
| 11 | P | 0 . . . N | For nested patterns. At least one element of P or one element of V shall exist in any P element. |
| 12 | @s | O | Start of the time range to which the key value applies. |
| 13 | @r | OD | The number of repeating times of the pattern. The r = 1 means that the pattern is not repeated. The r = −1 means that the pattern is repeated until the session end. |
| 14 | orderline | 0 . . . 1 | Values with their order values (another form of timed key values). The orderline element shall have at least one O or P element. Either timeline or orderline shall be present but not both. |
| 15 | O | 1 . . . N | Values (optionally with corresponding order values) |
| 16 | P | 0 . . . N | A pattern including a sequence of timed values that can be repeated. |
| 17 | O | 0 . . . N | For nested key values. |
| 18 | P | 0 . . . N | For nested patterns. At least one element of P or one element of O shall exist in any P element. |
| 19 | @s | O | Start of the time range to which the value applies. Only one of c or s attributes may be present, but not both. |
| 20 | @c | O | Starting number of the segment to which the value applies, i.e for c = 5, the first 4 segments are skipped and the fifth segment is the starting segment. The anchor (reference timing) of this time is the SBDStart parameter. SBDStart is obtained as defined in @startTime semantics in an SBD descriptor. If absent, the starting segment is the first segment in corresponding MPD or Period element, depending on which element the SBD descriptor is included. Only one of c or s attributes may be present, but not both. |
| 21 | @r | OD | The repeat time of the pattern. The r = 1 means that the pattern is not repeated. The r = −1 means that the pattern is repeated until the session end. |

Legend:
For attributes: M = Mandatory, O = Optional, OD = Optional with Default Value, CM = Conditionally Mandatory.
XML: elements are bold; attributes are non-bold and preceded with an @. List is a space-separated string (per xml:list)

As shown in Table 9, the pattern addressing represented by the P elements defined at rows 9 and 16 may be used for both timeline and orderline addressing represented by the timeline element at row 7 and orderline element at row 14.

In addition, the pattern addressing can be combined with regular addressing. For example, the timeline element at row 7 can include both a V element (regular addressing) and a P element (pattern addressing). Within the P element defined at row 9, there can be both a V element(s) and a P element(s). The orderline element at row 14 can include both an O element (regular addressing) and a P element (pattern addressing). Within the P element defined at row 16, there can be both an O element(s) and a P element(s).

Further, the pattern addressing can be employed to signal indefinite pattern repetition (i.e. to the end of the session). For example, as defined at rows 13 and 21, the repetition attribute r can have a predefined value (e.g., −1) to indicate the pattern is repeated until the end of a media access session.

The pattern addressing can also be used in a nested fashion and combined with regular addressing at any nesting level. As indicated at rows 11 and 18, a P element can include another P element to represent nested pattern repetition.

Similar to the regular timeline and orderline addressing, the pattern addressing may have a time or count offset by using the start time attribute s or starting segment number c. The pattern addressing in timeline addressing can be offset by time with the attribute s. The pattern addressing in orderline addressing can be offset by ether time (using the attribute s) or count (using the attribute c).

While the elements or attributes in Tables 5-9 are used as examples for explaining the inventive concepts, the disclosure is not limited to those examples. For example, in various embodiments, elements and attributes within a repeating element, P, to describe a sequence of timed key values in either timeline or orderline may take various forms which may or may not be similar to those provided in Tables 5-9. For example, the key values may be associated with a sequence of starting times of multiple time ranges instead of a sequence of durations as shown in Table 7.

In addition, the repeating pattern element may be defined to be an attribute included in a timeline or orderline element instead of being defined as an element in an XML file. Alternatively, the key value time line element of an SBD can be defined to be an object instead of an element. Accordingly, the elements and attributes in Table 9 can be adapted to a set of parameters suitable for the format of the object. For example, the repeating pattern element can be transformed to a loop parameter controlling repetition of a sequence of timed key values.

VII. Example Process of Session-Based DASH Operations

Figure 3:
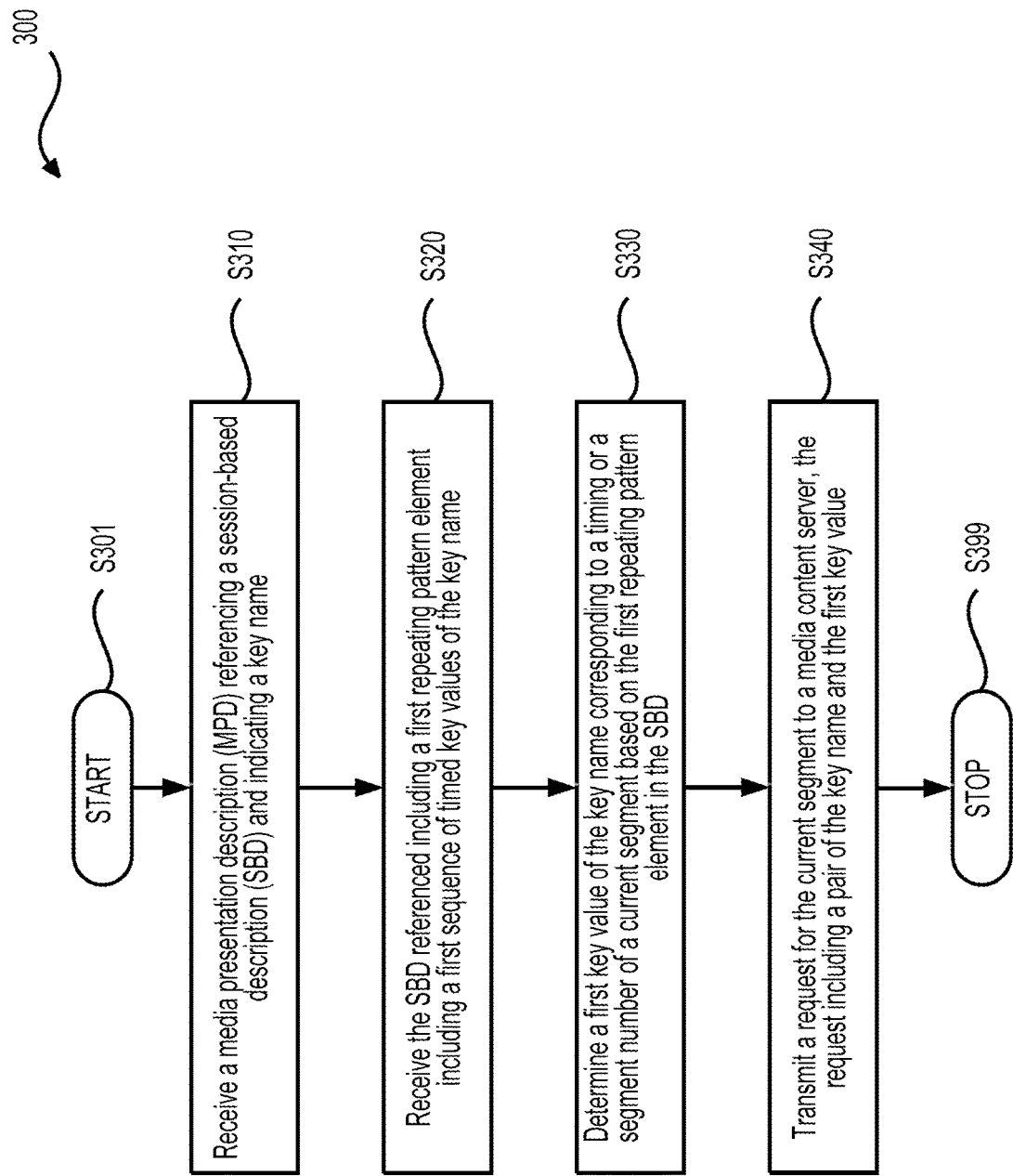
FIG. 3 shows a flow chart outlining an example process of session-based DASH operations in accordance with some embodiments.

FIG. 3 shows a flow chart outlining a process (300) of session-based DASH operations according to some embodiments of the disclosure. In various embodiments, the process (300) is executed by processing circuitry, such as the processing circuitry in the DASH client (102). In some embodiments, the process (300) is implemented in software instructions, thus when the processing circuitry executes the software instructions, the processing circuitry performs the process (300). The process (300) starts from (S301), and proceeds to (S310).

At (S310), an MPD can be received during a media access session, for example, from a media content server. The MPD can reference an SBD and indicate a key name. The MPD can describe a media presentation of media content partitioned into a sequence of segments.

At (S320), the SBD referenced by the MPD can be received, for example, from a session controller. The SBD can include a first repeating pattern element that includes a first sequence of timed key values of the key name. The first repeating pattern element indicates that the first sequence of timed key values of the key name is repeated along a timeline or an orderline.

At (S330), a first key value of the key name corresponding to a timing or a segment number of a current segment of the sequence of segments can be determined based on the first repeating pattern element in the SBD.

At (S340), a request for the current segment is transmitted to the media content server. The request can include a pair of the key name and the first key value. For example, the request can include an URL with the key name and the first key value included in a query part of the URL. The process can proceed to (S399), and terminate at (S399).

VIII. Computer System

The techniques, components (e.g., in the FIG. 1 and FIG. 2), functions, and embodiments described herein can be implemented by circuitry (e.g., integrated circuits, processors, and the like), or a combination of software and hardware. In some examples, the functions of the components can be implemented by instructions stored in a non-transitory computer-readable medium.

The techniques described above, can be implemented as computer software using computer-readable instructions and physically stored in one or more computer-readable media. For example, FIG. 4 shows a computer system (400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 4:
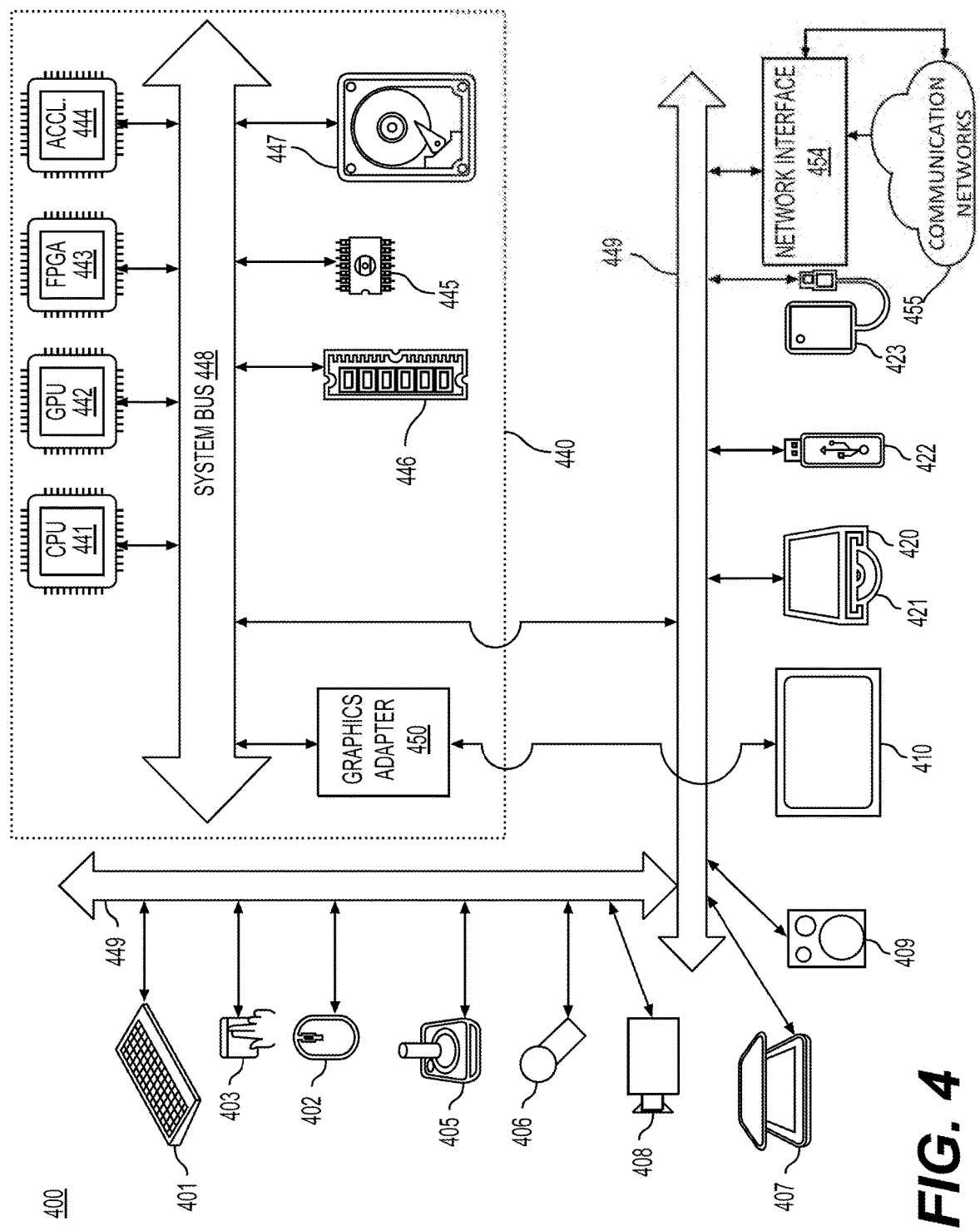
FIG. 4 is a schematic illustration of a computer system in accordance with an embodiment.

The components shown in FIG. 4 for computer system (400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (400).

Computer system (400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (401), mouse (402), trackpad (403), touch screen (410), data-glove (not shown), joystick (405), microphone (406), scanner (407), and camera (408).

Computer system (400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (410), data-glove (not shown), or joystick (404), but there can also be tactile feedback devices that do not serve as input devices), audio output devices (such as: speakers (409), headphones (not depicted)), visual output devices (such as screens (410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (410)) can be connected to a system bus (448) through a graphics adapter (450).

Computer system (400) can also include human accessible storage devices and their associated media such as optical media including CD/DVD ROM/RW (420) with CD/DVD or the like media (421), thumb-drive (422), removable hard drive or solid state drive (423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (400) can also include a network interface (454) to one or more communication networks (455). The one or more communication networks (455) can for example be wireless, wireline, optical. The one or more communication networks (455) can further be local, wide-area, metropolitan, vehicular and industrial, real-time, delay-tolerant, and so on. Examples of the one or more communication networks (455) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (449) (such as, for example USB ports of the computer system (400)); others are commonly integrated into the core of the computer system (400) by attachment to a system bus as described below (for example Ethernet interface into a PC computer system or cellular network interface into a smartphone computer system). Using any of these networks, computer system (400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (440) of the computer system (400).

The core (440) can include one or more Central Processing Units (CPU) (441), Graphics Processing Units (GPU) (442), specialized programmable processing units in the form of Field Programmable Gate Areas (FPGA) (443), hardware accelerators for certain tasks (444), and so forth. These devices, along with Read-only memory (ROM) (445), Random-access memory (446), internal mass storage such as internal non-user accessible hard drives, SSDs, and the like (447), may be connected through the system bus (448). In some computer systems, the system bus (448) can be accessible in the form of one or more physical plugs to enable extensions by additional CPUs, GPU, and the like. The peripheral devices can be attached either directly to the core's system bus (448), or through a peripheral bus (449). Architectures for a peripheral bus include PCI, USB, and the like.

CPUs (441), GPUs (442), FPGAs (443), and accelerators (444) can execute certain instructions that, in combination, can make up the aforementioned computer code. That computer code can be stored in ROM (445) or RAM (446). Transitional data can be also stored in RAM (446), whereas permanent data can be stored for example, in the internal mass storage (447). Fast storage and retrieve to any of the memory devices can be enabled through the use of cache memory, that can be closely associated with one or more CPU (441), GPU (442), mass storage (447), ROM (445), RAM (446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (400) and specifically the core (440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (440) that are of non-transitory nature, such as core-internal mass storage (447) or ROM (445). The software implementing various embodiments of the present disclosure can be stored in such devices and executed by core (440). A computer-readable medium can include one or more memory devices or chips, according to particular needs. The software can cause the core (440) and specifically the processors therein (including CPU, GPU, FPGA, and the like) to execute particular processes or particular parts of particular processes described herein, including defining data structures stored in RAM (446) and modifying such data structures according to the processes defined by the software. In addition or as an alternative, the computer system can provide functionality as a result of logic hardwired or otherwise embodied in a circuit (for example: accelerator (444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of session-based dynamic adaptive streaming over HTTP (DASH) operations at a DASH client, comprising:
receiving a media presentation description (MPD) referencing a session-based description (SBD) and indicating a key name during a media access session, the MPD describing a media presentation of media content partitioned into a sequence of segments;
receiving the SBD referenced by the MPD, the SBD including a first repeating pattern element that includes a first sequence of timed key values of the key name, the first repeating pattern element indicating that the first sequence of the timed key values of the key name is repeated along a timeline or an orderline;
determining a first key value of the key name corresponding to a timing or a segment number of a current segment of the sequence of segments based on the first repeating pattern element in the SBD; and
transmitting a request for the current segment to a media content server, the request including a pair of the key name and the first key value.

2. The method of claim 1, wherein the first repeating pattern element includes a repetition attribute indicating how many times the first sequence of the timed key values of the key name are repeated.

3. The method of claim 2, wherein when the repetition attribute has a value of −1, the first sequence of the timed key value of the key name is repeated until the end of the media access session.

4. The method of claim 2, wherein when the repetition attribute has a value of 1, the first sequence of the timed key value of the key name is not repeated.

5. The method of claim 1, wherein the first repeating pattern element includes a second repeating pattern element in a nested manner, the second repeating pattern element including a second sequence of timed key values of the key name,
the second sequence of the timed key values of the key name is repeated as indicated by the second repeating pattern element to form a third sequence of timed key values of the key name, and
the third sequence of the timed key values of the key name is part of the first sequence of the timed key values of the key name.

6. The method of claim 1, wherein the SBD includes a fourth sequence of timed key values of the key name outside of the first repeating pattern element.

7. The method of claim 1, wherein the first repeating pattern element includes a start time attribute indicating a start timing when the first sequence of the timed key values of the key name in the first repeating pattern element begins to apply.

8. The method of claim 7, wherein the start timing is represented by an offset with respect to a reference timing.

9. The method of claim 1, wherein the first sequence of the timed key values of the key name is repeated along the orderline, and the first repeating pattern element includes a start count attribute indicating a start segment number from which a sequence of the timed key values of the key name in the first repeating pattern element begins to apply.

10. The method of claim 9, wherein the start segment number is a segment number with respect to a start timing indicated by an SBD start time attribute of the SBD.

11. An apparatus of session-based dynamic adaptive streaming over HTTP (DASH) operations, comprising circuitry configured to:
receive a media presentation description (MPD) referencing a session-based description (SBD) and indicating a key name during a media access session, the MPD describing a media presentation of media content partitioned into a sequence of segments;
receive the SBD referenced by the MPD, the SBD including a first repeating pattern element that includes a first sequence of timed key values of the key name, the first repeating pattern element indicating that the first sequence of the timed key values of the key name is repeated along a timeline or an orderline;
determine a first key value of the key name corresponding to a timing or a segment number of a current segment of the sequence of segments based on the first repeating pattern element in the SBD; and
transmit a request for the current segment to a media content server, the request including a pair of the key name and the first key value.

12. The apparatus of claim 11, wherein the first repeating pattern element includes a repetition attribute indicating how many times the first sequence of the timed key values of the key name are repeated.

13. The apparatus of claim 12, wherein when the repetition attribute has a value of −1, the first sequence of the timed key value of the key name is repeated until the end of the media access session.

14. The apparatus of claim 12, wherein when the repetition attribute has a value of 1, the first sequence of the timed key value of the key name is not repeated.

15. The apparatus of claim 11, wherein the first repeating pattern element includes a second repeating pattern element in a nested manner, the second repeating pattern element including a second sequence of timed key values of the key name,
the second sequence of the timed key values of the key name is repeated as indicated by the second repeating pattern element to form a third sequence of timed key values of the key name, and
the third sequence of the timed key values of the key name is part of the first sequence of the timed key values of the key name.

16. A non-transitory computer-readable medium storing instructions that, when executed by a processor, cause the processor to perform a method of session-based dynamic adaptive streaming over HTTP (DASH) operations at a DASH client, the method comprising:
receiving a media presentation description (MPD) referencing a session-based description (SBD) and indicating a key name during a media access session, the MPD describing a media presentation of media content partitioned into a sequence of segments;
receiving the SBD referenced by the MPD, the SBD including a first repeating pattern element that includes a first sequence of timed key values of the key name, the first repeating pattern element indicating that the first sequence of the timed key values of the key name is repeated along a timeline or an orderline;
determining a first key value of the key name corresponding to a timing or a segment number of a current segment of the sequence of segments based on the first repeating pattern element in the SBD; and
transmitting a request for the current segment to a media content server, the request including a pair of the key name and the first key value.

17. The non-transitory computer-readable medium of claim 16, wherein the first repeating pattern element includes an repetition attribute indicating how many times the first sequence of the timed key values of the key name are repeated.

18. The non-transitory computer-readable medium of claim 17, wherein when the repetition attribute has a value of −1, the first sequence of the timed key value of the key name is repeated until the end of the media access session.

19. The non-transitory computer-readable medium of claim 17, wherein when the repetition attribute has a value of 1, the first sequence of the timed key value of the key name is not repeated.

20. The non-transitory computer-readable medium of claim 16, wherein the first repeating pattern element includes a second repeating pattern element in a nested manner, the second repeating pattern element including a second sequence of timed key values of the key name,
the second sequence of the timed key values of the key name is repeated as indicated by the second repeating pattern element to form a third sequence of timed key values of the key name, and the third sequence of the timed key values of the key name is part of the first sequence of the timed key values of the key name.

\* \* \* \* \*